United States Patent [19]
Nielson

[11] 4,022,559
[45] May 10, 1977

[54] PARISON SLICER FOR PLASTIC MOLDING MACHINES

[75] Inventor: William W. Nielson, Berkeley, Calif.

[73] Assignee: Flexible Plastics Corporation, Petuluma, Calif.

[22] Filed: Oct. 6, 1975

[21] Appl. No.: 619,998

[52] U.S. Cl. .............................. 425/184; 425/216; 425/302 B; 425/326 B

[51] Int. Cl.² .................................. B29D 23/04

[58] Field of Search ............. 425/DIG. 46, 302 B, 425/DIG. 206, 212, 455, 326 B, 216, 184, 185, 190, 196, 182; 264/99, 141, 142, 150

[56] References Cited
UNITED STATES PATENTS

| | | | |
|---|---|---|---|
| 2,995,775 | 8/1961 | Schnitzius et al. | 425/DIG. 51 |
| 3,121,361 | 2/1964 | Kramer | 83/564 |
| 3,418,694 | 12/1968 | Strauss | 425/DIG. 46 |
| 3,464,083 | 8/1969 | Adler | 425/DIG. 46 |
| 3,689,183 | 9/1972 | Denlinger | 425/217 |
| 3,752,631 | 8/1973 | Corbett et al. | 425/DIG. 46 |
| 3,788,181 | 1/1974 | Adair | 83/564 |
| 3,910,741 | 10/1975 | Mehnert | 425/302 B |

*Primary Examiner*—Richard B. Lazarus
*Attorney, Agent, or Firm*—Townsend and Townsend

[57] ABSTRACT

A nibbler for severing a heat softened plastic parison into small, readily re-used parison pieces or sections during molding machine downtimes. The nibbler has a pair of cooperating knives which move towards and away from each other and it is preferably permanently mounted to the molding machine. When the molding operation temporarily ceases, the nibbler is moved into registration with the parison and the latter is severed by the knives. The knives are positioned above a horizontal conveyor for the finish molded objects which transports them away from the machine. The severed parison sections are separated from the objects by passing both over openings which have a sufficient size so that the sections can drop therethrough while the finish formed objects pass thereover.

21 Claims, 4 Drawing Figures

U.S. Patent May 10, 1977 Sheet 1 of 2 4,022,559
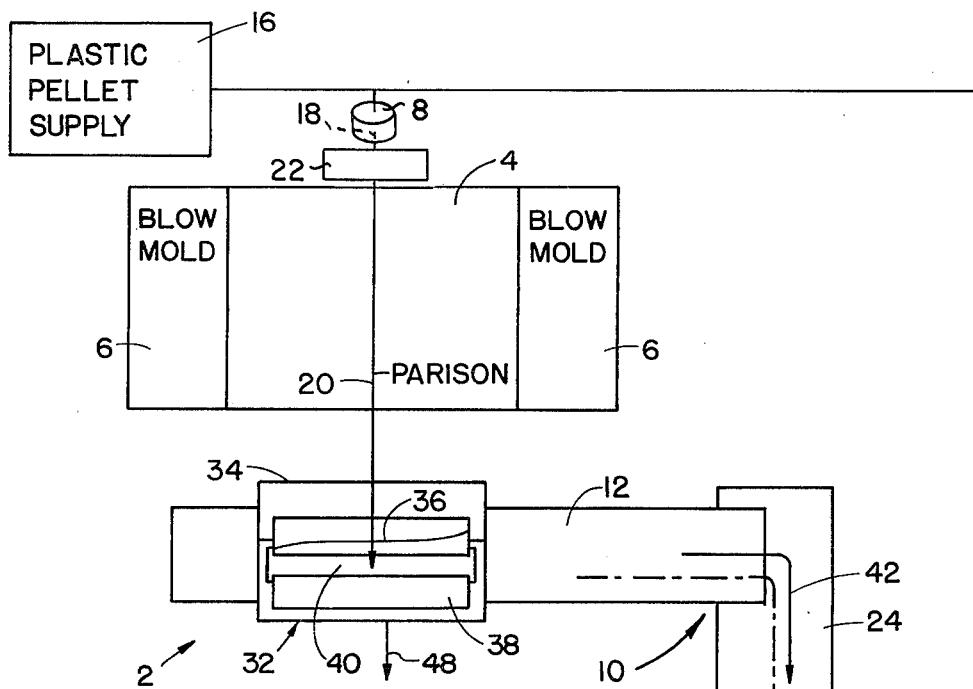
FIG._1.
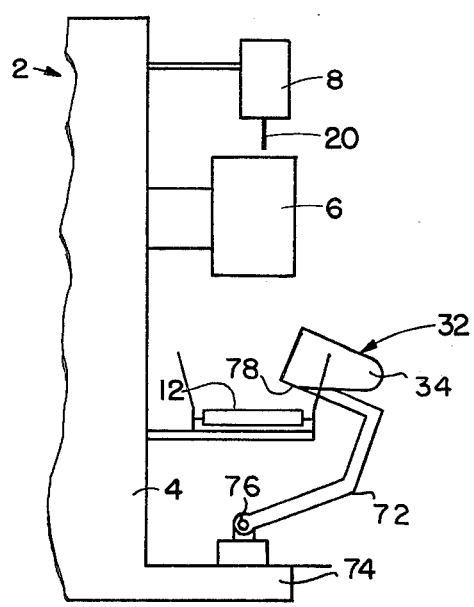
FIG._2.

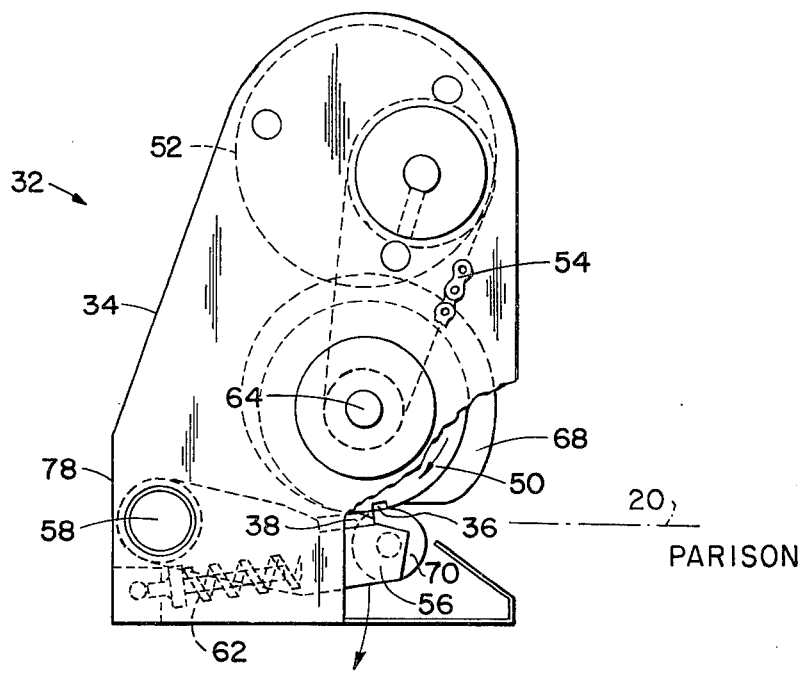
FIG._3.
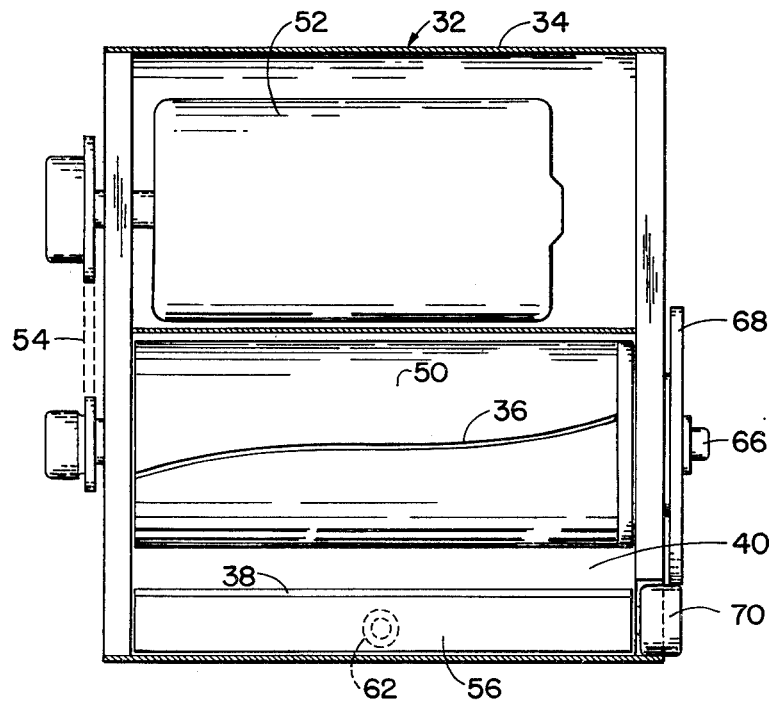
FIG._4.

PARISON SLICER FOR PLASTIC MOLDING MACHINES

BACKGROUND OF THE INVENTION

In molding, particularly blow molding articles such as bottles, the plastic is first heated to soften it and then extruded from an annular orifice into a tubular ribbon, commonly called a parison. The orifice points vertically downward so that the parison flows from the orifice. Relatively short strips or sections of the parison are then severed, inserted into a blow mold and expanded to the desired shape by blowing air or a gas into the parison until it is in firm contact with the walls of the interior mold cavity. Thereafter, the mold is opened and the bottle is discharged therefrom mechanically or by gravity for transport to an inspection station for packing and shipping. In many applications the transport is accomplished by providing a horizontal band conveyor beneath the mold which receives the discharged bottles and transports them away.

The molding machine must occasionally be shut down for short periods of time, often for no more than for 15 to 30 minutes, to make minor adjustments or repairs. When the plastic material is polyvinylchloride (PVC) this presents a problem because PVC must be kept in continuous motion in the extruder to prevent it from decomposing within the extruder. Consequently, during such downtimes, the extruder continues to operate which results in an accumulation of an initially hot and softened and thereafter hardened plastic mass. This mass is difficult to handle and cannot be ground into pellets in conventional grinders for subsequent re-use. Instead, the mass must either be discarded or hand sawed into small pieces that can be handled by the grinders. Either alternative is relatively expensive because of the ever increasing cost of petroleum based materials such as PVC or the high cost of manual labor.

To eliminate such waste hot melt grinders have been devised which receive the heat softened PVC parison and immediately grind into small pellets. Hot melt grinders are large and bulky and relatively expensive. Due to the large expense a single hot melt grinder is usually provided for several molding machines. When the machine is shut down the hot melt grinder is moved to the affected machine so that it can receive and grind the hot parison. The bulkiness of the machines block the access to the extruder and the mold and renders machine adjustments or repairs more difficult or impossible to perform. Moreover, the grinder is usually at the wrong place and must be moved substantial distances to the affected machine. This is time-consuming and permits the accumulation of parison which can no longer be introduced in the hot melt grinder and must therefore be discarded.

Another alternative to permitting the accumulation of hot parison is to purge the extruder with a material such as polyethylene which must not be kept in motion in the extruder so that the extruder can be shut down during adjustments or repair. The drawback of this method is that a substantial amount of PVC and polyethylene become intermixed, unusuable and must be discarded. The discarded plastic materials are non-reusable waste. Since each purging may require as much as 40 to 50 lbs. of plastic material this alternative is relatively expensive.

The magnitude of the above discussed waste problem is best illustrated by the fact that under a normal, three-shift operation of a conventional blow molding machine there is an average yearly waste of about 14,00 lbs. of PVC and 14,000 lbs. of polyethylene per machine. At current prices of 47 cents and 30 cents per lb., respectively, for these materials this amounts to a yearly waste of about $10–11,000.

SUMMARY OF THE INVENTION

The present invention seeks to eliminate the shortcomings encountered in the prior art by preventing the accumulation of large parison masses during machine downtimes and by eliminating the need for purging the extruder with polyethylene each time the molds must be shut down. Briefly, this is accomplished by providing a parison nibbler which can be moved into registration with the parison during machine downtimes and which slices the parison into short, readily re-ground sections. The re-ground sections are then recirculated and re-extruded to eliminate the earlier mentioned waste.

The nibbler generally comprises a pair of cooperating knives or blades which are mounted to a frame and which are intermittently moved towards each other to sever a parison section and away from each other so that a new length of parison can enter between the blades. The frame is mounted to an arm which is pivotally attached to the molding machine and which allows the withdrawal of the nibbler from registration with the parison during normal molding operations. The nibbler is downwardly open so that severed parison sections drop gravitationally onto the band conveyor for the molded articles for removal from the machine. The parison sections are thereafter separated from the bottles by passing them over a grill which has openings of a sufficient size so that the sections drop therethrough while the bottles continue on their way to an inspection or packing point.

The removed parison sections are fed to a conventional, already existing grinder which disintegrates the section into small pellets for circulation to the extruder, reheating and re-extrusion. The grinders have been used in the past for re-grinding scrap such as trimmings, which is generated during normal molding operations.

In the preferred embodiment of the invention, the knives of the nibbler are defined by a rotating blade and a cooperating pivotally mounted, reciprocating blade. The blades are relatively small and compace because they are cutting hot and soft material and do not occupy much space so that molding machine adjustments and repairs are readily performed with the nibbler in place. Moreover, the nibbler does not require its own transport mechanism for removing the severed parison sections, or for storing them, as is the case with prior art hot melt grinders to both reduce the costs of the nibbler and its space requirements.

Accordingly, the present invention is a substantial improvement over the prior art. As compared to hot melt grinders, it greatly reduces capital expenditures. As compared to other prior art methods of dealing with the parison during machine downtimes it eliminates costly polyethylene purging of the extruder and the accumulation of large PVC masses which must be discarded or tediously cut into small pieces for introduction into the grinder. Accordingly, the present invention affords substantial cost savings while facilitating the operation of plastic blow molding machines.

BRIEF DESCRIPTION OF THE DRAWINGS

FIG. 1 schematically illustrates a blow molding machine fitted with a parison nibbler constructed and installed in accordance with the present invention;

FIG. 2 is a schematic side elevational view illustrating the mounting of the nibbler in greater detail;

FIG. 3 is a side elevational view, with parts broken away of a nibbler constructed in accordance with the invention; and FIG. 4 is a plan view of the nibbler shown in FIG. 3.

DESCRIPTION OF THE PREFERRED EMBODIMENTS

Referring first to FIG. 1, a blow molding machine 2 generally comprises a main machine frame 4 to which are mounted one or more blow molds 6, a plastic extruder 8 and a conveying system 10 such as a horizontally oriented band conveyor 12 which is positioned beneath the blow mold so that molded articles drop gravitationally from the mold onto the band conveyor for transport to a collection receptacle 14. The blow molds are of a conventional construction and may, for example, comprise a pair of mold halves (not separately shown) which define between them an internal mold cavity (not shown in the drawings).

In use, fresh plastic, say PVC pellets are fed from a pellet supply 16 to extruder 8 where the pellets are heated to soften them, mixed and extruded through an annular orifice 18 to form a heat softened, tubular parison 20. A suitable length of parison is severed by parison cutter 22, inserted in one of the open blow molds, the mold is thereafter closed and pressurized air or gas is blown into an open end of the parison to expand it into the shape of the mold cavity to thereby form an article such as a bottle, for example. Thereafter, the blow mold is opened and the bottle is permitted to drop onto horizontal band conveyor 12 which conveys the bottle onto a second, transverse conveyor 24 along a path indicated by dotted line 26. From the second conveyor the bottles are transferred onto a grill 28 defined by downwardly inclined, elongate and spaced apart bars 30 which have a sufficient inclination so that the bottles slide gravitationally into receptacle 14.

As mentioned above, during machine downtimes, extruder 8 must be maintained in operation to prevent a degradation of the heated PVC therein. Consequently, even during downtimes a parison issued from orifice 18. To prevent its accumulation on the band conveyor, a parison nibbler 32 is provided which can be moved into registration with the parison for severing it into short parison sections. The sections are then ground into pellets and returned to pellet supply 16 for reextrusion.

Generally speaking, the nibbler comprises a housing 34 which mounts a pair of blades 36, 38 that can be moved towards and away from each other. When the blades are in their spaced apart position they define an open space 40 between them through which parison 20 can enter. The blades are cyclically closed to sever relatively short parison sections. The sections are permitted to drop gravitationally onto conveyor 12 for movement along the path indicated by solid line 42 to grill 28. On the grill the sections drop through openings 44 between bars 30 and are conveyed, e.g., dropped into a plastic grinder 46 which pellitizes the parison sections and thereafter returns the ground pellets to pellet supply 16 or directly to extruder 8 for re-extrusion into a parison. The nibbler continues in operation until the molding machine is ready to operate again. At that time the nibbler is generally horizontally withdrawn away from the molding machine in the direction of arrow 48 and the molding of bottles continues as above described. The ground pellets can be transferred from grinder 46 to extruder 8 or pellet supply 16 in any conventional manner such as by a pneumatic conveyor (not separately shown) or the like.

Thus, grill 28 separates the severed parison sections from the bottle flow indicated by arrow 26. Bars 30 defining the grill are sufficiently inclined and their spacing is such that the bottles cannot drop through openings 44; instead, they gravitationally slide over the grill bars into receptacle 14. On the other hand, nibbler 32 is adjusted so that the severed parison sections are of a sufficiently small size that they will drop through grill openings 44 into grinder 46. Preferably, the sections having a length less or only slightly more than the spacing between the grill bars to make certain that they will drop through the openings. It will be apparent, that the grill bar construction illustrated in FIG. 1 can be replaced with other means for separating the bottle flow from the severed parison section flow.

Turning now to the detailed construction of nibbler 32 and its installation on molding machine 2, first blade 36 is preferably a rotating knife mounted to a cylindrical drum 50 secured to a shaft 64 which is suitably journaled in nibbler housing 34. The drum is rotated at a constant rate by an electric motor 52 via a chain 54. The second blade 38 is a reciprocating blade carried by an arm 56 that is pivotally mounted to the nibbler housing by a pivot shaft 58. The blade is mounted to the face of arm 56 opposite drum 50 and a compression spring 62 urges the arm and therewith the blade in a counter-clockwise direction, as viewed in FIG. 3 towards drum 50.

A cam 68 is mounted to a protruding end 66 of shaft 64 on the side of the nibbler opposite chain 54. A cam follower 70 is secured to pivot arm 56 and positioned so that compression spring 62 biases it into engagement with the cam. Thus, cam 68 moves the pivot arm and therewith second blade 38 away from drum 50 to define space 40 between the blades but permits spring 62 to push the arm toward the drum when blade 36, 38 are mutually aligned so that the blades contact each other and sever the parison that is placed between them. To facilitate the severing action and to prevent excessive cutting forces the blades are preferably angularly inclined with respect to each other and/or curved as generally illustrated in FIG. 1 so that cutting action between the blades progresses from one end of the blades towards the upper end thereof as the drum rotates about its axis.

Nibbler 32 is pivotally secured to the molding machine frame 4 with a swing bar 72 the lower end of which is attached to a machine base 74 with a pivot pin 76. The upper end of the swing arm is rigidly secured, e.g., bolted to nibbler housing 34. The arm is shaped and dimensioned so that when the nibbler is in its operative position (as shown in FIG. 1) it is generally horizontally oriented and positioned between the orifice and the band conveyor. Open space 40 between blades 36, 38 is vertically aligned with extruder orifice 18 and the lower end 78 of the nibbler housing is spaced above band conveyor 12 so that severed parison sections can drop gravitationally from the blades past the open lower nibbler housing 78 onto the band conveyor. When the need for the nibbler ceases it is pivoted into its inoperative position (shown in FIG. 2) by manually pulling nibbler housing 34 to the right, as viewed in FIG. 2, until the nibbler housing is outside the vertical projection of band conveyor 12 and in an inclined position.

I claim:

1. Apparatus for molding a heat softened plastic into an object comprising: plastic extrusion means continuously extruding a heated plastic ribbon; a mold receiving short ribbon sections from said extrusion means and molding the sections into molded objects; conveying means disposed beneath the mold for transporting the objects away from the mold; and nibbler means attached to the apparatus and movable into and out of registration with the extruded ribbon engage the ribbon issuing from the extrusion during mold downtimes and sever the ribbon into small pieces for the subsequent re-use of the pieces, the nibbler means being positioned between the extrusion means and the transport means when the nibbler means is in registration with the ribbon, the nibbler means further including means discharging the pieces onto the conveying means.

2. Apparatus according to claim 1 when the conveying means comprises a generally horizontal conveyor, and including means for moving the nibbler means into registration with the extruding means at a point above the conveyor.

3. Apparatus according to claim 2 means pivotally connecting the nibbler means to the apparatus for pivotal movement of the nibbler means into and out of registration with the ribbon.

4. Apparatus according to claim 1 including means for removing the small pieces from the conveying means, the removing means permitting the continued transport of the objects on the conveying means past a point at which the pieces are removed.

5. Apparatus according to claim 4 wherein the removing means comprises means defining open spaces of a sufficient size to permit the pieces to gravitationally drop therethrough.

6. Apparatus according to claim 1 wherein the nibbler means comprises a frame, means mounting the frame to the apparatus for movement into and out of registration with the extrusion means, a first blade rotatably mounted to the frame, a second frame mounted to the blade, and means moving the second blade into cooperating position with the first blade when the blades are substantially aligned and for moving the second blade away from the first blade when the blades are out of mutual alignment to define an open space between the blades when they are out of alignment through which the extended ribbon can extend, whereby a small section is severed from the ribbon each time the blades are proximate each other.

7. Apparatus according to claim 6 wherein the second blade moving means includes spring means urging the second blade towards the first blade, and cam means operatively coupled with the second blade and opposing the spring means for controlling the movements of the second blade.

8. Apparatus according to claim 7 wherein the cam means is secured to an rotates with the first blade.

9. An improved plastic blow molding apparatus comprising in combination a parison extruder continuously extruding a parison; a blow mold forming sections of the parison into objects; conveying means disposed beneath the mold receiving the finished objects and transporting them away from the apparatus; a parison nibbler operable to slice the parison into short sections during mold downtimes to thereby prevent the accumulation of large parison quantities during such downtimes; means movably attaching the nibbler to the apparatus and positioning the nibbler so that it can be moved into and out of registration with the parison being extruded, and means discharging the short sections onto the conveying means when the nibbler is in registration with the extruder.

10. Apparatus according to claim 9 including means operatively connected with the conveying means for gravitationally discharging the short sections only from the objects on the conveying means.

11. Apparatus according to claim 10 including means for grinding the short sections into small pellets and means for returning the pellets to the extruder for re-extrusion into a parison.

12. Apparatus according to claim 11 wherein the nibbler includes cooperating first and second knives, means for rotating the first knife, and means for intermittently moving the second knife towards and into operative proximate position with the first knife to thereby sever from the parison a section each time the knives are in proximate position and for permitting the parison to enter between the knives when the knives are remoted from each other.

13. In a plastic molding machine having an extruder extruding a heated plastic ribbon, a mold forming a segment of the ribbon into an object, and conveying means positioned to receive the discharged objects and to transport the objects away from the mold, the improvement comprising: apparatus severing the ribbon issuing from the extruder into short sections during mold downtimes to facilitate the re-use of extruded but unmolded lengths of ribbon, the severing apparatus including a frame, opposing knives mounted to the frame, means moving the knives towards each other into a ribbon severing position and separating the knives thereafter to define an open space between them through which the ribbon can extend, means permanently mounting the severing apparatus to the machine, means moving the apparatus between first and second positions in which the apparatus is remote from the ribbon and in which the space between the knives is in registration with the extruded ribbon, respectively, and means removing the severed ribbon sections from the machine.

14. A machine according to claim 13 wherein the knife moving means includes means for rotating at least one of the knives.

15. A machine according to claim 14 wherein the knife moving means includes means for reciprocating the second knife towards and away from the first knife.

16. A machine according to claim 13 wherein the means for removing the severed sections comprises means for discharging the sections in a generally downward direction.

17. Apparatus according to claim 13 wherein the severed section discharging means comprises means directing the sections onto the conveying means.

18. A machine according to claim 13 wherein the conveying means comprises a generally horizontal band conveyor and is positioned beneath the mold, wherein the object drops gravitationally from the mold onto the conveying means, and wherein the means for moving the severing apparatus between its first and second positions include means for positioning the severing apparatus between the extruder and the band conveyor at a point above the band conveyor, and wherein the means for removing the severed sections comprises means for gravitationally discharging the severed sections onto the band conveyor.

19. A machine according to claim 18 and further including second conveying means for transporting the objects from the band conveyor to a point of use, the second conveying means including cutouts of a sufficient size to permit the severed ribbons to drop therethrough while retaining the objects on the second conveying means for transport to the point of use.

20. An improved blow molding apparatus comprising in combination:
   a frame;
   a plastic extruder mounted to the frame including means heating the plastic and continuously discharging a heated, softened parison from a downwardly facing orifice;
   a blow mold mounted to the frame and positioned to receive a parison section from the extruder and operative to form an object from the section;
   means severing the parison section from the parison being discharged by the extruder;
   a conveyor system disposed beneath the mold and the orifice receiving formed objects and transporting them to a point of use, the conveying system including a portion having downwardly facing openings of such a size that the objects are retained on the conveying system while moving to the point of use;
   a parison nibbler including cooperating first and second blade means, housing means mounting the blade means so that a space between the blade means is open; and means cyclically moving the blade means towards and away from each other at a rate so that relatively short parison pieces are severed which have a size less than the size of the openings;
   means movably connecting the nibbler to the frame to move the nibbler during mold downtimes between a first, inoperative position in which the nibbler is withdrawn from beneath the orifice and a second, operative position in which the open space between the blade means is in registration with the orifice for receiving the parison in the space and intermittently severing it into the short pieces during mold downtimes;
   whereby the nibbler can be moved into registration with the orifice to discharge the severed parison pieces onto the conveyor system for transport to the openings in said conveyor portion for separation of the pieces from the objects by discharging them through the openings.

21. An apparatus acording to claim 20 wherein the moveably connecting means comprises an elongate arm mounting the nibbler to an end thereof, and means pivotally securing another end of the arm to the frame for pivotal movement of the nibbler space into and out of registration with the orifice.

* * * * *